United States Patent Office 3,406,167

Patented Oct. 15, 1968

3,406,167

PURIFICATION OF CAPROLACTAM

Chao-Shing Cheng, Williamsville, N.Y., and Richard C. Hecker, Petersburg, Basil G. Apostle, Richmond, and Orvill E. Snider, Petersburg, Va., assignors to Allied Chemical Corporation, New York, N.Y., a corporation of New York No Drawing. Filed Nov. 9, 1965, Ser. No. 507,060
11 Claims. (Cl. 260—239.3)

ABSTRACT OF THE DISCLOSURE

A method for purifying epsilon caprolactam by (A) forming a mixture of the crude lactam with certain proportions of alkali metal hydroxide and water, establishing in said mixture a temperature range of 15° C. to 75° C. and separating the liquid caprolactam from the aqueous alkali metal hydroxide phase (B) contacting an aqueous solution of the lactam containing impurities with adsorbent carbon and thereafter separating the aqueous lactam from said carbon and distilling said lactam (C) thereafter optionally treating the lactam with an oxidizing agent or a halogen of atomic weight 35 to 80 and subsequently contacting with adsorbent carbon and distilling.

The present invention relates to purification of epsilon-caprolactam, more particularly to removal of oxidizable organic impurities therefrom.

Epsilon-caprolactam is a valuable starting material for production of synthetic linear polyamides, e.g. poly-epsilon caprolactam (nylon 6), having utility in the form of filaments, extruded articles, molded articles etc. A very high purity caprolactam is required to assure good quality in polyamides produced therefrom. A troublesome problem has been to separate certain oxidizable impurities from crude caprolactam obtained for example by Beckmann rearrangement of cyclohexanone oxime, by nitrosation of cyclohexyl compounds, e.g. of cyclohexyl carboxylic acid as described in U.S.P. 3,022,291 or by depolymerization of poly-e-caprolactam, e.g. in accordance with the process of U.S. Patent No. 3,182,055 of Bonfield, Hecker, Snider and Apostle of Feb. 18, 1963 entitled "Regeneration of E-Caprolactam from Polyamides" assigned to the assignee hereof.

Quantitatively the concentration of oxidizable impurities can be expressed as "permanganate number" (P.N.) determined in accordance with the method of U.S.P. 3,021,326 to O. E. Snider, R. H. Belden, D. R. Beuerman and D. W. Seebohm of Feb. 13, 1962, entitled, "Purification of Caprolactam" and assigned to the assignee hereof. Essentially it is determined by adding 1 ml. of N/100 $KMnO_4$ aqueous solution to 50 ml. of 0.1% caprolactam aqueous solution; maintaining agitation for 250 seconds; and measuring optical density of the resulting mixture in a cell of 5 cm. path with light of 410 millimicron wavelength. This shows the extent of oxidation of impurities by permanganate by measuring the intensity of yellow coloration due to oxidation product formed. P.N. values herein are calculated by multiplying the measured optical density by 100, "optical density" being defined as $\log_{10}$ (light transmitted by the solvent/light transmitted by the solution). Caprolactam having an oxidizable impurity concentration corresponding to a P.N. of about 20–30 is generally suitable for preparation of good quality poly-epsilon-caprolactam. However, preparation of fine denier poly-epsilon-caprolactam of satisfactory tensile strength requires lactam of very low oxidizable impurity concentration, corresponding to a P.N. of about 0 to 5.

It has been proposed, in the aforementioned U.S.P. 3,021,326, to remove oxidizable contaminants from crude caprolactam by forming a mixture of the lactam, alkali metal hydroxide, e.g. sodium hydroxide, potassium hydroxide, and mixtures thereof, said mixture containing not more than about ten parts impurity per 90 parts by weight of lactam, at least about 1% water and at least about 5% alkli metal hydroxide; the weight proportions of caprolactam; alkali metal hydroxide: water lying about in the quadrilateral on an equilateral triangular composition diagram bounded by the lines connecting points at about the point:

(1% lactam, 69% alkali metal hydroxide, 30% water)
(1% lactam, 19% alkali metal hydroxide, 80% water)
(55% lactam, 5% alkali metal hydroxide, 40% water)
(93% lactam, 5% alkali metal hydroxide, 2% water);

and establishing in said mixture temperatures within the range from about 15° C. to about 75° C.; separating the liquid caprolactam phase from the aqueous alkali metal hydroxide phase and recovering purified caprolactam by distilling the separated caprolactam. The distilled caprolactam is subsequently crystallized by freezing according to the procedure of U.S.P. 2,813,858 of Nov. 19, 1957, to G. G. Joris assigned to Allied Chemical Corporation to bring the oxidizable impurity concentration to a value corresponding to P.N. values in range of about 35 to 100. Caprolactam of acceptable P.N. values e.g. about 0 to 30 can be obtained by multiple recrystallization of the lactam. The crystallization procedure which is used is laborious and requires costly and elaborate equipment.

It is the object of the present invention to provide an improved method for removing oxidizable impurities from caprolactam.

This and other objects and advantages will be apparent from the following description of our invention.

We have made the surprising discovery that the foregoing disadvantages of the process of U.S.P. 3,021,326 are overcome and caprolactam of low oxidizable impurity concentration is obtained by treatment of the lactam with adsorbent carbon in place of crystallization as disclosed in the aforementioned patent.

Our novel process comprises removing impurities from caprolactam by:

(A) Forming a mixture of the lactam with alkali metal hydroxide and water, said mixture having not more than about 10 parts impurity per 90 parts by weight lactam; at least about 1% water and 5% alkali metal hydroxide, in weight proportions of caprolactam, alkali metal hydroxide and water lying within the quadrilateral on an equilateral triangular composition diagram bounded by the lines connecting points at about the point:

(1% lactam, 69% alkali metal hydroxide, 30% water)
(1% lactam, 19% alkali metal hydroxide, 80% water)
(55% lactam, 5% alkali metal hydroxide, 40% water)
(93% lactam, 5% alkali metal hydroxide, 2% water);

establishing in said mixture temperatures within the range of 15° C. and 75° C. and separating the liquid caprolactam from the aqueous alkali metal hydroxide phase.

(B) Contacting an aqueous solution of lactam with adsorbent carbon and thereafter separating the aqueous lactam from said carbon; and distilling said lactam. Distillation of the lactam must be performed as a final step. Steps A and B, the caustic treatment and carbon treatment steps respectively, can be carried out in any convenient order.

If desired, further purification of the lactam after distillation can be achieved by repeating the above purification process or any of the steps thereof. Alternatively, lactam having an extremely low concentration of oxidizable impurities (corresponding to a P.N. of about 0 to 5) is obtained by carrying out the essential treatment steps of the invention in conjunction with a treatment of the lactam with an oxidizing agent or desirably a halogen of atomic weight 35 to 80. After treatment with halogen or oxidant, the lactam should be contacted with adsorbent carbon and distilled to remove the reaction products of the halogen or oxidant treatment.

The order in which the treatment steps of the invention is performed can be varied widely. A preferred sequence for carrying out the process of the invention is: adsorbent carbon treatment, alkali metal hydroxide treatment and distillation. Desirably the optional treatment of lactam with halogen is performed subsequent to steps A and B and the distillation of this novel process according to the sequence: carbon treatment, alkali metal hydroxide treatment, distillation, halogen treatment, adsorbent carbon treatment and distillation.

If carried out before the essential steps A and B and prior to a final distillation step, the process can be performed in the following sequence: halogen or oxidant treatment, alkali metal hydroxide treatment, adsorbent carbon treatment, and distillation.

Preferably in treating aqueous caprolactam with adsorbent carbon according to the present invention the lactam solution is contacted with at least about 0.015 part by weight of carbon per part by weight of lactam contained in the solution. Use of amounts of carbon in excess of about 0.08 part per part by weight of lactam, while effective, is unnecessary. In order to achieve efficient removal of oxidizable impurities, preferably concentrated aqueous lactam solutions, i.e. solutions containing lactam in concentrations varying from about 70% by weight to substantial saturation, are contacted with the adsorbent carbon. An excellent result is obtained by contacting aqueous solutions containing about 75-90% by weight crude lactam with the carbon. The temperature at which the treatment with carbon is carried out is not critical and in general the aqueous lactam is contacted with the adsorbent carbon at temperatures in the range of about ambient temperatures to 100° C. Treatment of the aqueous lactam at temperatures in excess of about 100° C. while effective is accompanied by rapid evaporation of water from the lactam solution, and hence is undesirable. Preferably, the carbon treatment of aqueous crude lactam in accordance with the invention is performed at 75°–100° C. temperature to prevent deposition of oligomers in the carbon pores.

The adsorbent carbon employed in the present process preferably has a particle size in the case of granular adsorbent carbons of at least a 50 mesh size (U.S. sieve series) for example adsorbent carbon having a mesh size in the range 4 x 6 to about 20 x 50 and particularly 12 x 40, i.e. small enough to pass through a screen of mesh size 12 but retained by a screen of mesh size 40. In the case of pulverized or powdered adsorbent carbon used in the subject process, the carbon must have a major portion of particles of mesh size less than about 325 (U.S. sieve series). While in our process we can use adsorbent or activated carbon having animal, vegetable or mineral origin, we prefer to use activated carbons having mineral origin, such as those derived from coal. These are desired over vegetable, or animal carbons since they are harder and resist abrasion when gases and liquids are flowed through the same. It is to be understood, however, that activated carbons having an animal origin such as bone or blood activated carbons and those having a vegetable origin such as wood are suitable in the instant process. We prefer granular carbon derived from coal be used over powdered or pulverized activated carbons since the caprolactam can be more readily passed through the same.

The efficiency of removal of impurities by adsorbent carbon is dependent in part on the total volume of the pores and on the distribution of the total pore volume with respect to the diameters of the pores. Preferably in order to achieve efficient removal of oxidizable impurities from caprolactam according to the present process, we employ adsorbent carbon having a pore volume of about 0.8 cc. per gram or greater particularly about 0.9 to 0.95 cc. per gram. Preferably, the adsorbent carbon employed has at least about 20% and especially about 40% of its total pore volume distributed among pores having a diameter in the range of about 20 to 500 angstrom units. A particularly good result is obtained in employing adsorbent carbon having about 30% or more of its total pore volume distributed among pores having a diameter in the range of about 20 to 100 angstrom units. Representative examples of the preferred adsorbent carbons are presented in the following table:

| Adsorbent carbon | Pore volume, cc. per gram | Approximate percentage distribution of pore volume among— | |
|---|---|---|---|
| | | Carbon pores of diameter 20–500 angstrom units | Carbon pores of diameter 20–100 angstrom units |
| Pittsburgh activated carbon type OL (Pittsburgh chemical company) | 0.81 | 22 | 8.7 |
| Pittsburgh activated carbon type SGL | 0.85 | 21 | 8.2 |
| Pittsburgh activated carbon type CAL | 0.94 | 40 | 32 |

The treatment of aqueous lactam with powdered carbon is preferably effected by agitating the adsorbent carbon in the lactam solution for about 5 to 60 minutes or longer, desirably employing about 0.02 parts of powdered carbon per part by weight of the crude lactam. An excellent result is generally obtained by agitating the aqueous lactam-carbon slurry for about 30 minutes. On completion of the treatment the spent carbon is separated from the aqueous crude lactam in a conventional manner, e.g., by filtration.

According to another preferred mode of operation which is particularly suited to purification of commercial quantities of lactam, the aqueous solution of crude lactam is flowed through one or more beds, towers, or columns packed with granular adsorbent carbon. An especially good result is obtained by using 0.045 to 0.055 part of granular carbon per part by weight of crude lactam contained in the aqueous solution. To achieve efficient removal of oxidizable impurities, the aqueous crude lactam is passed through the granular carbon at a relatively slow rate i.e. at a rate no greater than about 4 parts of lactam per part by weight adsorbent carbon per hour.

Preferably, the lactam solution is flowed through the carbon at a rate of about 1 to 3 parts of crude lactam per part by weight of carbon per hour. Use of low flow rates, for example a flow rate of lactam solution corresponding to about 0.1 parts of lactam by weight per part by weight of carbon per hour, while effective, is impractical.

A particular advantage of using granulated carbon according to the preferred embodiment of the present invention is the ease with which the spent granulated carbon, e.g., granulated carbon which has been contacted with about 18 to 22.5 weight equivalents of crude caprolactam, can be regenerated. Thus, the adsorptive capacity of the spent granulated carbon is restored by passing super-heated steam at temperatures of about 250–350° C., especially about 300° C. through the carbon. To achieve efficient regeneration of the carbon at least about 3 parts and preferably about 4 to 6 more parts of steam per part of spent carbon are employed.

According to a preferred embodiment of our invention distillation of the lactam is effected under diminished pressure in a manner similar to that disclosed in aforementioned U.S.P. 3,021,326. Advantageously, the lactam is distilled at a pressure of about 1–4 mm. particularly at about 1–2 mm. Hg. Desirably the temperature of the still is maintained below about 150° C. at those pressures in order to avoid decomposition of the lactam during distillation.

Prior to distillation the aqueous lactam is conveniently dehydrated to a water content of less than about 0.1% by heating at moderate temperature e.g. about 100° C. and under moderate diminished pressure e.g. 35–50 mm. Hg.

Treatment of lactam with oxidizing agent or halogen having atomic weight between 35 and 80 according to one embodiment of the invention is conveniently effected in an aqueous lactam solution varying in concentration from about 70% by weight of lactam up to substantial saturation with respect to the lactam of the solution at the treatment temperature. The treatment of aqueous lactam is preferably performed at a temperature of at least 0° C. to insure rapid reaction of the impurities with the halogen or oxidant. At these temperatures, pressures and concentration of halogen or oxidizing agent, the lactam does not react with the oxidant or the halogen. Preferably the treatment is effected at a temperature below about 50° C. to avoid reaction of the lactam with the treatment agent. Generally, a good result is obtained by treating the aqueous lactam with halogen or oxidizing agent at about ambient temperature.

In carrying out purification of the lactam with a halogen, e.g. chlorine or bromine, the halogen is gradually charged to the lactam solution conveniently under agitation until a slight concentration of unreacted halogen persists in the lactam solution as indicated by development of a blue or purple color with starch-potassium iodide indicator. Generally, addition of about 0.04 to 0.07% by weight of halogen based on the weight of the lactam is sufficient. The reaction proceeds relatively rapidly. Advantageously chlorine is added in admixture with an inert diluent e.g. nitrogen. A good result is obtained employing a mixture of diluent and chlorine containing about 18% by weight chlorine. Bromine is conveniently charged in a dilute aqueous solution containing for example 1% by weight bromine. Molecular chlorine tends to impair the adsorption capacity of the carbon used in subsequent carbon treatment of the aqueous lactam. Hence, the unreacted chlorine in the lactam solution is desirably chemically combined to avoid this effect as by making the solution alkaline as determined by phenophthalein indicator, prior to treatment of the aqueous lactam with carbon.

In using oxidizing agents other than halogens according to a preferred embodiment of our purification process, about $2 \times 10^{-5}$ to $6 \times 10^{-5}$ redox equivalents of oxidant based on the weight of the lactam is agitated in the lactam solution for about 1 to 4 hours, particularly for about 3 hours. Advantageously readily available potassium permanganate is employed as oxidizing agents. Other suitable oxidizing agents include inter alia potassium bichromate, hydrogen peroxide, ozone, alkali metal persalts and the like.

The present process can be utilized to purify any crude lactam containing permanganate oxidizable impurities e.g., crude lactam prepared by depolymerization of poly-epsilon-caprolactam, by the Beckmann rearrangement of cyclohexanone oxime or by nitrosation of cyclohexyl carboxylic acid and some of its derivatives. The preferred operating sequence of the invention is particularly applicable to purification of lactam which is produced by depolymerization of poly-epsilon-caprolactam. Such crude lactam may contain minor amounts of oily textile lubricants ("finishing oils") which are efficiently removed by the initial carbon treatment using the preferred sequence of steps according to our basic process.

The present novel process is at least as effective as the process of U.S.P. 3,021,326 in removing the oxidizable contaminants of crude caprolactam. Lactam which has been purified according to the preferred mode of carrying out the present invention has a lower oxidizable impurity content, e.g., corresponding to a P.N. of about 20–30, than lactam purified by the prior art process as performed with one crystallization, and is suitable for most applications in preparing good quality poly-epsilon-caprolactam. Lactam which has been purified in accordance with the invention using an oxidizing or halogen treatment has an extremely low oxidizable impurity content (corresponding to a P.N. of about 0 to 5) and is suitable for preparation of fine denier poly-epsilon-caprolactam of excellent quality and tensile strength.

In the following examples which illustrate our invention, parts and percentages are by weight and temperatures are in degrees centigrade unless otherwise noted.

Example 1

*Part A.*—Crude ε-caprolactam which was obtained by neutralizing the Beckmann rearrangement product of cyclohexanone oxime and which had a permanganate number of 2620 (determined according to the procedure of U.S.P. 3,021,326) is dried in vacuo at 100° C. under a pressure of about 40–50 mm. Hg. The dried lactam was distilled at about 102–119° C. (still head temperature) under a pressure of about 1–2 mm. Hg to remove tars and inorganic salts. During the distillation the temperature of still pot is maintained below about 150° C. to prevent decomposition of the lactam. An 85% aqueous solution of a 160 part aliquot of the distillate (permanganate number 405) was agitated with 3.2 parts (corresponding to 2% of the ε-caprolactam) powdered adsorbent carbon (Nuchar C–190-N, West Virginia Pulp & Paper Co.) for 30 minutes. Nuchar C–190-N has a surface area of between 700 and 950 square meters per gram,[1] a pore volume of 0.9 cubic centimeter per gram, an apparent density of 14–16 pounds per cubic foot. The pH of powdered Nuchar C–190-N is about 6–8. The fineness of Nuchar-C–190-N is such that 91–99% passes through a 100 mesh screen, 70–90% passes through a 200 mesh screen, and 50–75% passes through a 325 mesh screen. The molasses value of powdered Nuchar C–190-N is 171–200. The material contains a maximum of 3% water solubles, a maximum of 6% total ash and a moisture when packed of about 3%. The carbon was removed by filtration and the filtrate was agitated at ambient temperature with an equal value (196 parts by volume) of 25% aqueous sodium hydroxide at 40° C. for 5 minutes in accordance with the procedure of U.S.P. 3,021,326. The upper aqueous caprolactam layer of the mixture was withdrawn and was dried and distilled in vacuo as previously described. The caprolactam produced had a permanganate number of 31.

*Part B.*—A gaseous mixture of chlorine and nitrogen (containing 0.17 part of chlorine per part of nitrogen) was bubbled through an 80% aqueous solution of the product obtained in Part A of this example until the solution give a light purple color with potassium iodide-starch indicator indicating the presence of a slight excess of chlorine. The solution, which was made alkaline to phenolphthalein by addition of 25% aqueous sodium hydroxide, to remove excess chlorine, was treated with adsorbent carbon, dried and distilled in vacuo as described in Part A above. The caprolactam thus obtained had a permanganate number of 5.7.

Example 2

*Part A.*—An 85% aqueous solution of 100 parts of the crude distilled caprolactam employed as starting material in Example 1 above, Part A was treated substantially as described in Example 1 Part A except that the steps of treatment with aqueous sodium hydroxide, drying and distillation preceded treatment of the aqueous caprolactam with adsorbent carbon. After removal of the carbon by filtration, the aqueous caprolactam was dried and distilled in vacuo as previously described in Example 1, ---
[1] As measured in accordance with the procedure of S. Brunauer et al., J. Am. Chem. Soc., 60, 309 (1938).

Part B. The caprolactam (85 parts) which was obtained had a permanganate number of 51.

*Part B.*—The procedure of Part A of this example was repeated in purifying 324 parts of the crude distilled caprolactam of Example 1 Part A employing two successive treatments with aqueous sodium hydroxide according to the method of U.S.P. 3,021,326. The permanganate number of the purified caprolactam (310 parts) obtained was 45.4.

Example 3

The following example illustrates the purification of $\epsilon$-caprolactam obtained by depolymerization of poly-$\epsilon$-caprolactam:

Several samples of aqueous crude caprolactam which are obtained by depolymerizing poly-$\epsilon$-caprolactam according to the procedure of U.S. Patent No. 3,182,055 assigned to the assignee hereof were concentrated by evaporation of water to provide samples of aqueous $\epsilon$-caprolactam containing about 75% $\epsilon$-caprolactam (permanganate number 2243) and about 0.1 to 0.14% finishing oils.

In several experiments the aqueous samples were flowed through two columns (1 x 5') which were connected in series and which were each packed with 0.7 part of granulated absorbent carbon (Type CAL, Pittsburgh Chemical Co.). Pittsburgh Chemical Company type CAL granular activated carbon has a total surface area of between 1000 and 1100 square meters per gram, an apparent density of 0.44 gram per cubic centimeter or 27.5 pounds per cubic foot, a particle density of 0.7 gram per cc., a pore volume of 0.94 cc./g. and a percent void in a dense packed column of 38%. The activated carbon has a mesh size in the U.S. sieve series of 12 x 40, no more than 5% of the carbon having a particle size larger than 12 mesh and no more than 5% having a particle size smaller than 40 mesh. The mean particle diameter of the activated carbon is 0.90–1.10 millimeters. The activated carbon has a minimum iodine number of 1000, a minimum molasses number of 230, a percent ash maximum of 8.5, a percent maximum of moisture as packed of 2.0 and an abrasion number of at least 75. After treatment of each sample 4.2 to 5.6 parts of steam were passed through the carbon. The flow rate of lactam sample through the carbon, the total amount of lactam sample treated and the finishing oil content of the sample before and after treatment for each experiment is presented in the table below:

| Experiment | Average flow rate (parts of lactam per part of carbon per hour) | Amount of lactam treated (parts of lactam per part of carbon) | Finishing oil content of (percent)— | |
|---|---|---|---|---|
| | | | Treated sample | Untreated sample |
| 1 | 1.0 | 19.0 | 0.01 | 0.10 |
| 2 | 1.1 | 20.2 | 0.01 | 0.14 |
| 3 | 1.0 | 22.4 | 0.01 | 0.14 |
| 4 | 1.0 | 20.9 | 0.01 | 0.14 |

The carbon treated lactam solutions (1.1 parts per hour) obtained in the above experiments were charged to the base of a baffled extraction column and contacted at 75° C. countercurrently and continuously with a 25% aqueous solution of sodium hydroxide (4 parts per hour) according to the procedure of U.S.P. 3,021,326. Spent aqueous caustic which is collected at the base of the column was recirculated. Periodically, after treatment of every 10 parts of lactam solution fresh aqueous caustic (1 part) was added to the recirculating caustic liquor in order to compensate for consumption of aqueous caustic in the process.

The caustic treated lactam samples were collected from the top of the extraction column and combined. The aqueous lactam solution containing 12% water was flowed at a rate of about 1.3 parts per hour through a packed dehydration column (2" x 22") maintained at about 100° C. under a pressure of about 25–50 mm. Hg absolute. The dried caprolactam (1.3 parts per hour, containing 0.5–0.7% water) was charged continuously to a vacuum film evaporator equipped with a packed fractionating column and was distilled at 135–140° C. (still temperature) under pressure 1–3 mm. Hg absolute. The caprolactam distillate (1.3 parts per hour) has a permanganate number in the range of 20–30.

From the foregoing it is readily seen that we have provided new and useful methods of purifying caprolactam which methods economically enable the attainment of caprolactam with a low quantity of oxidizable materials as indicated by the low permanganate number. It will also be observed that the methods of our invention do not require use of expensive and difficult to obtain chemicals nor is unusual equipment required.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

We claim:
1. A process for removing from crude caprolactam containing impurities oxidizable by potassium permanganate which process consists essentially of
 (a) forming a mixture of the crude lactam with alkali metal hydroxide and water, said mixture having not more than about 10 parts impurity per 90 parts by weight lactam; at least about 1% water and 5% alkali metal hydroxide, in weight proportions of caprolactam, alkali metal hydroxide and water lying within the quadrilateral on an equilateral triangular composition diagram bounded by the lines connecting points at about the point:
 (1% lactam, 69% alkali metal hydroxide, 30% water)
 (1% lactam, 19% alkali metal hydroxide, 80% water)
 (55% lactam, 5% alkali metal hydroxide, 40% water)
 (93% lactam, 5% alkali metal hydroxide, 2% water)
   establishing in said mixture temperatures within the range of 15° C. to 75° C. and separating the liquid caprolactam from the aqueous alkali metal hydroxide phase;
 (b) contacting an aqueous solution of said lactam containing impurities with absorbent carbon, said lactam being present in a concentration from about 70% by weight to substantial saturation of said solution at a temperature between about ambient temperature to about 100° C. and thereafter separating the aqueous lactam from said carbon; and
 (c) distilling said lactam.

2. The process as defined in claim 1 wherein said aqueous solution of lactam is contacted with absorbent carbon prior to formation of said mixture of lactam with alkali metal hydroxide and water and separation of the liquid lactam from the aqueous alkali metal hydroxide phase.

3. The process as defined in claim 1 wherein subsequent to said step (b), said lactam is first treated with an oxidizing agent or a halogen which has an atomic weight between 35 and 80 and then contacted with adsorbent carbon.

4. The process as defined in claim 2 wherein subsequent to said step (b), said lactam is first treated with an oxidizing agent or a halogen which has an atomic weight between 35 and 80 and then contacted with adsorbent carbon.

5. The process as defined in claim 4 wherein the halogen is chlorine.

6. The process as defined in claim 4 wherein the oxidizing agent is potassium permanganate.

7. The process as defined in claim 4 wherein said adsorbent carbon has a pore volume of at least about 0.8 cc. per gram, at least 20% of the pores having a diameter in the range of about 20 to 500 angstrom units.

8. The process as defined in claim 1 wherein said crude caprolactam is produced by depolymerization of poly-epsilon-caprolactam and contains, in addition to said oxidizable impurities, minor amounts of oily textile lubricants.

9. The process as defined in claim 4 wherein said crude caprolactam is produced by depolymerization of poly-epsilon-caprolactam and contains, in addition to said oxidizable impurities, minor amounts of oily textile lubricants.

10. The process as defined in claim 9 wherein the halogen is chlorine.

11. The process as defined in claim 9 wherein the oxidizing agent is potassium permanganate.

References Cited

UNITED STATES PATENTS

| | | | |
|---|---|---|---|
| 2,752,336 | 6/1956 | Boon et al. | 260—239.3 |
| 2,828,307 | 3/1956 | Soeterbrock et al. | 260—239.3 |
| 3,021,326 | 2/1962 | Snider et al. | 260—239.3 |
| 3,145,198 | 8/1964 | Morbidelli et al. | 260—239.3 |
| 3,179,657 | 4/1965 | Naglieri | 260—239.3 |

HENRY R. JILES, *Primary Examiner.*

R. T. BOND, *Assistant Examiner.*